Feb. 6, 1968　　　　F. M. SCHLUTER　　　　3,367,000
DETACHABLE FASTENING DEVICE
Filed Oct. 23, 1965　　　　　　　　　　　　　2 Sheets-Sheet 1

INVENTOR.
FRANK M. SCHLUTER
BY Paul L. Gardner
ATTORNEY

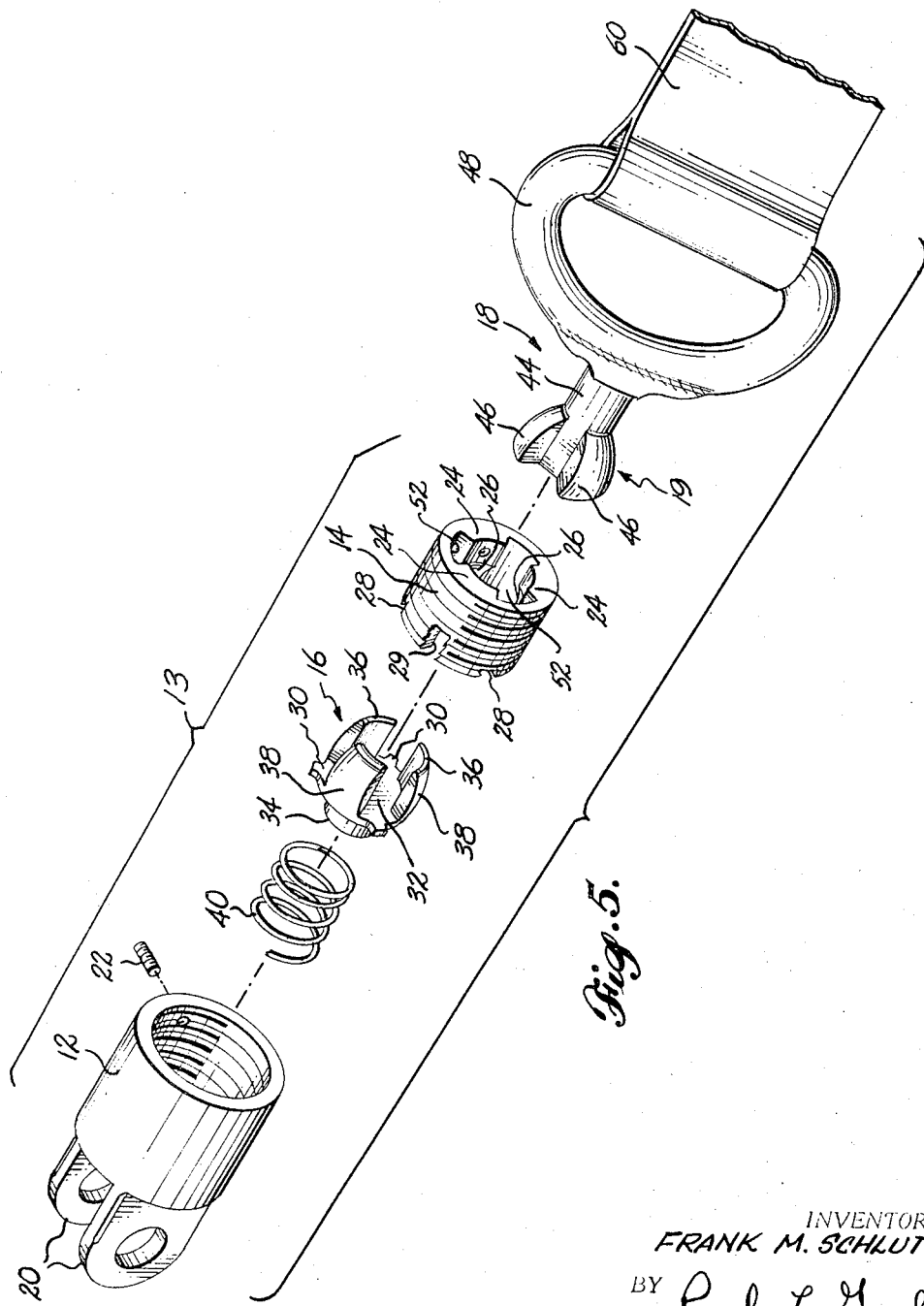

United States Patent Office 3,367,000
Patented Feb. 6, 1968

3,367,000
DETACHABLE FASTENING DEVICE
Frank M. Schluter, Seattle, Wash., assignor to The Boeing Company, Seattle, Wash., a corporation of Delaware
Filed Oct. 23, 1965, Ser. No. 503,359
12 Claims. (Cl. 24—221)

ABSTRACT OF THE DISCLOSURE

A fastening device characterized by its ability to detachably secure two members to one another quickly and easily. The device comprises a generally cup-shaped socket member secured to one of the two members to be joined, and an attachment member secured to the other member to be joined and adapted to fit in the socket. The socket member includes a plurality of inwardly-extending, circumferentially-spaced lugs adjacent its open end, and the attachment member includes a plurality of outwardly-extending, circumferentially-spaced lugs which pass between the socket lugs and fit behind them when the attachment member is inserted into the socket and rotated. A keeper element having a plurality of upstanding, circumferentially-spaced lugs is disposed in the socket member behind the socket lugs for preventing inadvertent removal of the attachment member from the socket.

---

The present invention relates generally to improvements in fastening devices, and more particularly to an improved, easily detachable fastener for temporarily securing a strap, cable or the like to a structural member or another strap or cable.

In the transportation industry, the same vehicle is often used for carrying passengers and cargo. In the airplane industry, for example, a given plane may carry only passengers on one trip, only cargo on another trip, and a combination of cargo and passengers on a subsequent trip.

When transporting cargo by aircraft cargo restraining nets are ordinarily employed to hold the cargo in place. These nets commonly comprise networks of straps which are attached to the floor, ceiling and side walls of the aircraft and form barriers which restrain the cargo from movement and thus protect the crew and passengers from "flying cargo," especially under crash conditions.

In order to secure these barrier or cargo restraining nets to the interior of the aircraft, cooperating sets of hooks and shackles have heretofore been employed. The shackles are commonly attached to the aircraft between the exterior and interior side walls, and the cooperating hooks are attached to the outer ends of the net straps. The net straps are also provided with adjusting buckles adjacent their outer ends for taking up the slack in the straps after they are hooked to their respective shackles.

Although the above described hook-and-shackle arrangement provides an adequate means for securing cargo barrier nets in aircraft, it has not proven to be entirely satisfactory. One problem associated with this arrangement is that it is a relatively tedious and time consuming task to connect and disconnect the net strap ends to and from the aircraft. Each time a strap is to be disconnected, the associated adjusting buckle must be loosened to provide slack in the strap and permit the hook to be manipulated out of engagement with its associated shackle; and the buckle must be adjusted to tighten the strap when the hook and shackle are connected. The problem is magnified, of course, when several cargo nets are installed in or removed from an aircraft when converting the plane from passenger to cargo, or vice-versa, where numerous straps must be connected or disconnected. This problem is also encountered where a plane is used to carry part cargo and part passengers. Each time one of the crew wishes to pass through the cargo-carrying area of the plane, he must disconnect several of the cargo net straps from one of the side walls, and then reconnect them. With each strap he must struggle with the adjusting buckle and hook to provide and take up slack in the strap.

Accordingly, it is one of the objects of the present invention to provide an improved fastening device for detachably securing two members together. A further object is to provide such a fastener which may be connected and disconnected with relative speed and ease.

Another disadvantage of the above-mentioned hook-and-shackle arrangements is that they detract from the appearance of the plane on which they are installed. Either the shackles must be installed to extend through the inner walls of the plane (during passenger as well as cargo flights) to permit the strap hooks to be secured thereto, or relatively large openings must be cut in the walls so that the shackles may be pivoted behind the walls during passenger flights.

It is a further object of this invention to provide a fastening device which may be used to connect straps or other members to wall structure without detracting from the appearance of the wall structure.

Still another drawback associated with the hook-and-shackle fastening arrangement is that the net straps must be provided with relatively heavy and bulky adjusting buckles to furnish and take up slack when disconnecting and connecting the hooks and shackles. These buckles add unwanted weight to the already cumbersome net.

A further object of this invention is to provide a fastening device for use between a strap and structural member which obviates the need for an adjusting device on the strap.

The foregoing objects have been realized by providing a ball-and-socket type fastener which includes a novel, spring-loaded keeper or latch element for locking the ball and socket members in place.

Other objects and advantages of the instant invention will become apparent from the following specification, the appended claims and the drawings wherein:

FIGURE 5 is an exploded view of the fastener.

Figure 4:
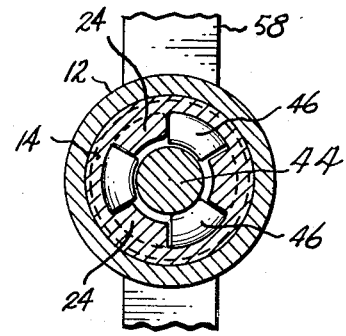
FIGURE 4 is a sectional plan view of the fastener taken along the line 4—4 of FIGURE 2.
Figure 1:
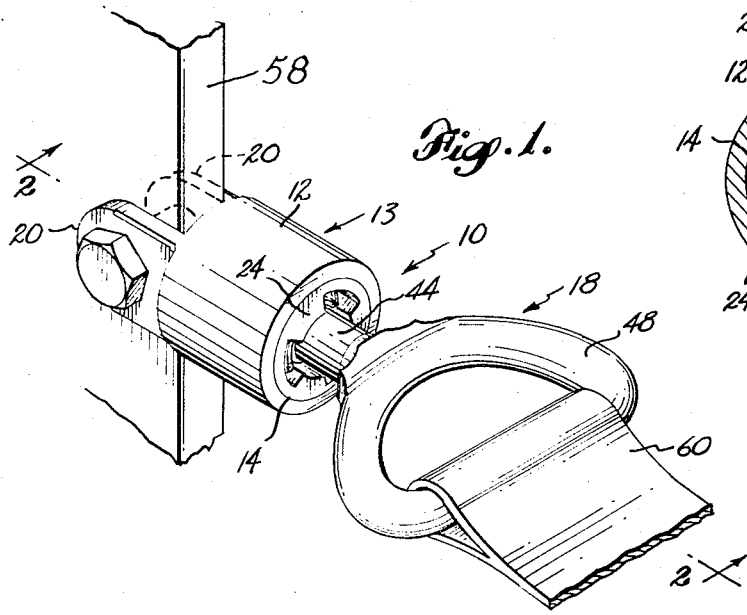
FIGURE 1 is a perspective view of a preferred embodiment of the fastening device of this invention shown in the connected condition.
Figure 2:
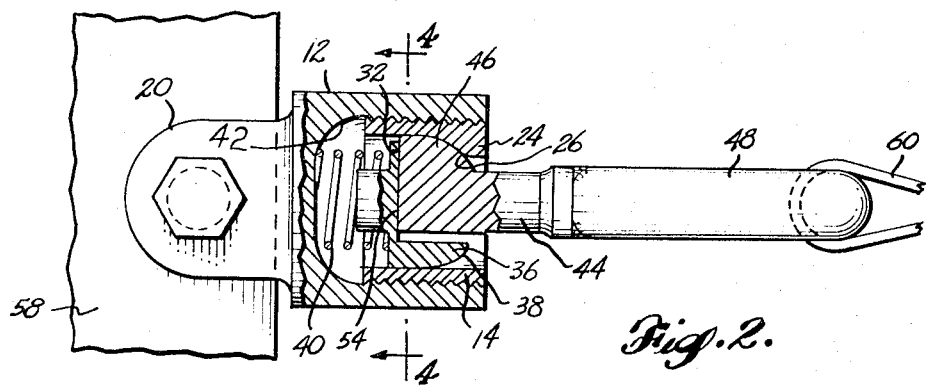
FIGURE 2 is a sectional elevation view of the fastening device taken along the line 2—2 of FIGURE 1.

Referring now to the drawings, it is seen that the fastener 10 of this invention comprises a cup shaped receptacle 12 and an attachment member 18. The receptacle houses a sleeve-shaped socket fitting 14 and a spring-biased keeper or latch element 16, which together form a socket member 13 for receiving a ball member 19 on one end of the attachment member 18.

The receptacle 12 is open at its forward end and internally threaded for receiving the externally threaded socket fitting 14. Two apertured, rearwardly extending flanges 20, 20 are provided at the rear of the receptacle for pivotably securing it to a structural member, such as the floor or wall or an aircraft.

The socket fitting 14 is screwed into the forward end of the receptacle 12 and held against rotational movement by means of a pin 22 (see FIG. 5). It is provided with three circumferentially spaced, radially inwardly extending lugs 24, 24, 24 adjacent its forward end, and the inwardly facing surfaces 26, 26, 26 of these lugs are concave to form load bearing surfaces. Six circumferentially-spaced grooves 28, 29, 28, 29, 28, 29 are cut in the rear edge of the fitting and cooperate with three radially outwardly extending projections 30, 30, 30 on the keeper 16 for a purpose described below.

The keeper or latch element 16 fits in the rear portion of the receptacle cup, and comprises a substantially disc-shaped base plate 32, a spring-retaining stub 34 extending rearwardly from the rear surface of the plate, and three circumferentially-spaced lugs 36, 36, 36 extending forwardly from the forward surface. The outer surfaces 38, 38, 38 of lugs 36, 36, 36 are convexly curved to fit the concave surfaces 26, 26, 26 on the socket fitting lugs, and a coil spring 40 is disposed between the closed end 42 of the receptacle and the keeper base plate for constantly urging the keeper 16 into engagement with the socket fitting 14.

As noted above, the keeper base plate is provided with three radially outwardly extending projections 30, 30, 30. These projections are retained in grooves 28, 28, 28 or 29, 29, 29 in the rear edge of the socket fitting to prevent relative rotational movement between the keeper 16 and socket fitting 14 until the keeper is depressed rearwardly against the force of the spring 40. The attachment member 18 includes a stem portion 44 having a ball member 19 integrally formed on one end and a strap retaining ring 48 welded or otherwise suitably secured to the opposite end. The ball member comprises three circumferentially spaced lugs 46, 46, 46 which have convexly-curved outer surfaces 50, 50, 50 that complement the concave inner surfaces 26, 26, 26 of the socket fitting lugs 24, 24, 24.

It should be noted that the semi-spherical shape of the load bearing surfaces 26, 38 and 50 of the socket fitting lugs, keeper lugs and ball lugs, respectively, permit angular, axial tension loading of the fastening device. These load bearing surfaces may be other than spherical in shape, however, where angular loading capabilities are not required.

Figure 3:
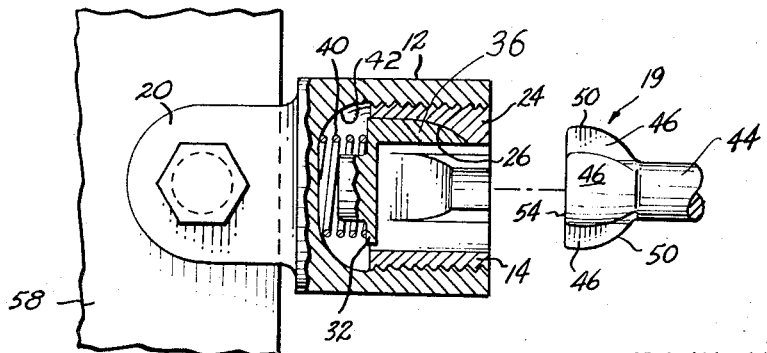
FIGURE 3 is a sectional elevation view similar to FIGURE 2 but showing the fastener in the disconnected condition.

In use, the socket member 13 is secured to a structural member 58 (such as a bracket on the floor or side wall of an airplane, for example) by means of flanges 20, 20; and the attachment member is secured to a strap or cable 60 (such as one of the straps of a cargo barrier net, for example) by means of retaining ring 48. As best shown in FIGURE 3, prior to the time that the ball member 19 of the strap fitting 18 in inserted into the socket member the keeper element lugs 36 will be disposed directly behind the socket fitting lugs 24 and biased thereagainst by the spring 40. The projections 30, 30, 30 on the keeper base plate 32 and the grooves 28, 28, 28 in the rear edge of the socket fitting cooperate to prevent rotational displacement of the keeper.

To secure the attachment member 18 to the socket member 13, the ball member 19 is inserted into the socket member with the ball lugs 46, 46, 46 positioned in the slots or spaces 52, 52, 52 (FIG. 5) between the socket fitting lugs 24, 24, 24. When the leading surface 54 of the ball member seats on the forward surface of the keeper, the ball member is depressed in the socket to urge the keeper rearwardly against the force of the spring 40. This will displace projections 30, 30, 30 from grooves 28, 28, 28 and permit the keeper to rotate in the socket fitting. The attachment member 18 is then rotated approximately sixty degrees so that the ball lugs 46, 46, 46 will line up directly behind the socket fitting lugs 24, 24, 24 and the spring 40 will urge the keeper and ball member forwardly against the socket fitting. In this position the keeper projections 30 will register with socket fitting grooves 29, 29, 29 to again lock the keeper against rotational movement.

To disconnect the fastener, the ball member is simply depressed in the socket member against the spring 40, and rotated sixty degrees. The ball lugs will then be aligned with the slots 52, 52, 52 of the socket fitting, and the ball may be removed from the socket receptacle.

The materials from which the fastener of the present invention is made may vary, of course, in accordance with the environment in which it is to be used. To obtain maximum strength with a minimum size fitting, it has been found that high heat treat steels, such as stainless steel, give optimum results. Less expensive materials (such as steel investment castings, for example) may be used, however, where size and/or strength requirements are less critical.

Of course it is contemplated that the fastener of this invention may be used for numerous purposes other than securing cargo barrier nets in aircraft. It may be employed whenever it is desired to detachably secure two members to one another.

As can be seen from the foregoing, the fastener of this invention provides a relatively quick and easy-to-use means for detachably securing two members together. The socket receptacle may be secured behind a wall (such as the interior wall of an airplane) with a small hole cut in the wall to expose the open end of the receptacle, and a decorative plug may be placed in the wall hole when the fastener is not being used. Thus, the fastener will not detract from the appearance of the wall. When used in conjunction with a cargo barrier net, no adjusting buckles are necessary on the net straps since no slack in the straps is required to connect and disconnect them. Moreover, the fitting is relatively simple and inexpensive to construct and assemble.

While the invention has been shown and described with reference to a preferred embodiment thereof, it is contemplated that various changes in form and details may be made therein without departing from the spirit and scope of the invention. For example, the ball member and cooperating keeper and socket members may be formed with more or less than three lugs, and the structure of the flanges 20, 20 on the receptacle 12 and/or the retaining ring 48 may be changed or modified to accommodate the structures of the different elements to be joined. Accordingly, it should be understood that this invention is to be limited only by the scope of the appended claims.

What is claimed is:

1. A fastening device for detachably joining two elements to one another comprising:

a socket member having an open forward end and a rear end, said socket member including a plurality of circumferentially-spaced, radially inwardly extending lugs adjacent its open forward end, and means defining a plurality of spaces between said lugs;

an attachment member detachably secured in said socket member, said attachment member including a plurality of circumferentially-spaced, radially outwardly extending lugs, and means defining a plurality of spaces between said lugs, said attachment member lugs being disposed in said socket member rearwardly of and aligned with said socket member lugs, said spaces between said attachment member lugs being aligned with said spaces between said socket member lugs;

a keeper element disposed in said socket member between the rear end thereof and said attachment member, said keeper element comprising a base portion, a plurality of circumferentially-spaced, upstanding lugs, and means defining a plurality of spaces between said lugs, said keeper element lugs being disposed in said spaces between said attachment member lugs;

spring means biasing said keeper element forwardly in said socket member; and cooperating locking means disposed on said keeper element and on said socket member for normally preventing relative rotational movement therebetween while permitting such relative rotational movement when said keeper element is depressed rearwardly in said socket member against the bias of said spring means.

2. A fastening device as claimed in claim 1, and further including means on said socket member and means on said attachment member for securing said socket and attachment members, respectively, to the elements to be joined.

3. A fastening device as claimed in claim 1, wherein there are an equal number of said lugs on said socket member, on said keeper element, and on said attachment member.

4. A fastening device as claimed in claim 1, wherein said keeper element lugs and said attachment member lugs are provided with convexly-curved outer surfaces, and said socket fitting lugs are provided with complementary concavely-curved inner surfaces, whereby the fastening device may be angularly loaded in tension.

5. A fastening device for detachably joining two elements to one another, comprising:
 a substantially cup-shaped receptacle having an open forward end and a rear end;
 a substantially sleeve-shaped socket fitting secured in said receptacle adjacent the open forward end thereon,
 said socket fitting including a plurality of circumferentially-spaced, radially inwardly extending lugs;
 a keeper element disposed in said receptacle between the said rear end thereof and said socket fitting,
 said keeper element comprising a substantially disc-shaped base plate and a plurality of circumferentially-spaced, upstanding lugs thereon;
 spring means disposed in said receptacle between the said rear end thereof and said keeper element for biasing said keeper element against said socket fitting; and
 an attachment member detachably secured in said receptacle,
 said attachment member comprising a stem portion, a plurality of circumferentially-spaced, radially outwardly extending lugs defining a ball member disposed on one end of said stem portion, and means disposed on the other end of said stem portion for securing said attachment member to one of the two elements to be joined,
 said attachment member lugs being disposed in said receptacle between said keeper base plate and said socket fitting lugs.

6. A fastening device as claimed in claim 5, and further including engaging means disposed on said keeper element and said socket fitting for preventing relative rotational movement therebetween.

7. A fastening device as claimed in claim 6, wherein said engaging means comprises at least one radially outwardly extending projection on said keeper base plate and means defining at least one cooperating groove in the rear end of said socket fitting.

8. A fastening device as claimed in claim 6, and further including at least one rearwardly extending, apertured flange secured on the rear end of said receptacle for securing said receptacle to one of the two elements to be joined.

9. A fastening device as claimed in claim 5, wherein there are equal numbers of said lugs on said socket fitting, on said keeper element, and on said attachment member, and wherein all of said lugs are of substantially equal radial width.

10. A fastening device as claimed in claim 9, wherein there are three of said lugs on each of said socket fitting, said keeper element, and said attachment member.

11. A fastening device as claimed in claim 5, wherein said keeper element lugs and said attachment member lugs are provided with convexly-curved outer surfaces, and said socket fitting lugs are provided with complementary concavely-curved inner surfaces, whereby the fastening device may be angularly loaded in tension.

12. A fastening device for detachably joining two elements to one another, comprising:
 a substantially cup-shaped receptacle having an open forward end and a closed rear end; flange means formed on the closed rear end of said receptacle for securing said receptacle to one of the two elements to be joined;
 a substantially sleeve-shaped socket fitting removably secured in said receptacle adjacent the open forward end thereof;
 cooperating internal thread means on said receptacle and external thread means on said socket fitting for removably securing said socket fitting in said receptacle,
 said socket fitting including three circumferentially-spaced, radially inwardly extending lugs; said socket fitting lugs being provided with concavely-curved inner load bearing surfaces,
 said socket fitting having a rear peripheral edge provided with means defining six circumferentially-spaced grooves therein;
 a keeper element disposed in said receptacle between the said closed rear end thereof and said socket fitting,
 said keeper element comprising a substantially disc-shaped base plate and three circumferentially spaced, upstanding lugs thereon,
 said keeper element lugs being provided with convexly-curved outer load bearing surfaces;
 three circumferentially-spaced, radially outwardly extending projections formed on the peripheral edge of said keeper element base plate for cooperating with said grooves in said socket fitting rear edge to prevent relative rotational movement between said keeper element and said socket fitting;
 spring means disposed in said receptacle between the said closed rear end thereof and said keeper element for biasing said keeper element against said socket fitting; and
 an attachment member detachably secured to said receptacle; said attachment member comprising a stem portion, three circumferentially-spaced, radially outwardly extending lugs defining a ball member disposed on one end of said stem portion, and retaining means disposed on the other end of said stem portion for securing said attachment member to one of the two elements to be joined,
 said attachment member lugs being provided with concavely-shaped outer load bearing surfaces and being disposed in said receptacle between said keeper base plate and said socket fitting lugs,
 each of said socket fitting lugs, said keeper element lugs, and said attachment member lugs being of substantially equal radial width.

References Cited

UNITED STATES PATENTS 2,567,069   9/1951   Harley _____ 24—221
2,971,178   2/1961   Reesby _____ 287—103 X OTHELL M. SIMPSON, *Primary Examiner.*

E. SIMONSEN, *Assistant Examiner.*